United States Patent [19]
Galloway

[11] 3,726,131
[45] Apr. 10, 1973

[54] ULTRASONIC TEST FIXTURE AND METHOD OF MAKING THE SAME

[75] Inventor: Brooke A. Galloway, Monroe, Conn.
[73] Assignee: Avco Corporation, Stratford, Conn.
[22] Filed: Nov. 22, 1971
[21] Appl. No.: 200,684

[52] U.S. Cl. ........................... 73/71.5 U, 73/67.8 R
[51] Int. Cl. .................................... G01n 29/04
[58] Field of Search ................ 73/67.8 R, 67.8 S, 73/67.9, 71.5 U

[56] References Cited

UNITED STATES PATENTS 2,956,185  10/1960  Von Stocker ............... 73/67.8 X
3,183,709  5/1965   Rankin et al. ............... 73/67.9 X Primary Examiner—Richard C. Queisser
Assistant Examiner—John P. Beauchamp
Attorney—Charles M. Hogan et al.

[57] ABSTRACT

An ultrasonic test fixture for determining the thickness of a turbomachine blade is made by attaching the heads of nails to predetermined positions on the outer surface of the blade. Generally cylindrical cores are positioned over the shank of the nails and a room-temperature curable material is poured around the blade and cylindrical cores and allowed to cure to form a base. When the base has hardened the cylindrical cores are removed, thus providing cylindrical passages extending generally at right angles to the surface of the blade at the predetermined positions. A transducer is positioned in each passage by a sleevelike element. The transducer is displaced and pivoted to a predetermined position and orientation relative to the blade to produce an optimum signal. The sleevelike element is secured in place in the passages to form a permanent guide for the transducer.

11 Claims, 3 Drawing Figures

PATENTED APR 10 1973 3,726,131

INVENTOR.
BROOKE A. GALLOWAY
BY Charles M. Hogan
Gary M. Dron
ATTORNEYS.

INVENTOR.
BROOKE A. GALLOWAY

ULTRASONIC TEST FIXTURE AND METHOD OF MAKING THE SAME

In recent years ultrasonic testing has been used quite extensively for the nondestructive testing of various material. This test involves the application of ultrasonic mechanical energy to a specimen and the detection of the resultant ultrasonic mechanical vibration by a suitable device, such as a piezoelectric transducer. In the field of gas turbine engines this technique has been applied to turbomachine blades and vanes with great success. However, there is a particular problem when attempting to ultrasonically test an object with an irregularly contoured surface, such as a turbomachine blade. The problem arises from the fact that the ultrasonic transducer must be oriented at a predetermined position relative to the surface of the specimen to produce an optimum signal. With objects having a well-defined shape, it is a simple matter. However, with the complex contour of a turbomachine blade, a very complex and elaborate fixture must be used to hold the transducer in position. Therefore, it is an object of the present invention to provide a highly simplified, economical and effective fixture that positions an ultrasonic transducer on a test specimen having an irregularly contoured surface.

This end is achieved by an ultrasonic test fixture made by attaching at least one pilot shaft generally at a right angle to a point on the surface of an irregularly contoured test specimen. A cylindrical core is telescoped over the pilot shaft and a base is formed around the test specimen, the pilot shaft and the core. The core and the pilot shaft are removed to produce a passage extending from the test specimen. An ultrasonic transducer is supported in the passage by a sleevelike element having a generally spherical outer surface abutting the walls of the passage. The transducer is pivoted and displaced to a predetermined orientation and position relative to the test specimen to produce an optimum signal. The sleevelike element is secured in place to form a guide for the transducer.

The above and other related objects and features of the present invention will be apparent from a reading of the description of the disclosure shown in the accompanying drawings and the novelty thereof pointed out in the appended claims.

Figure 1:
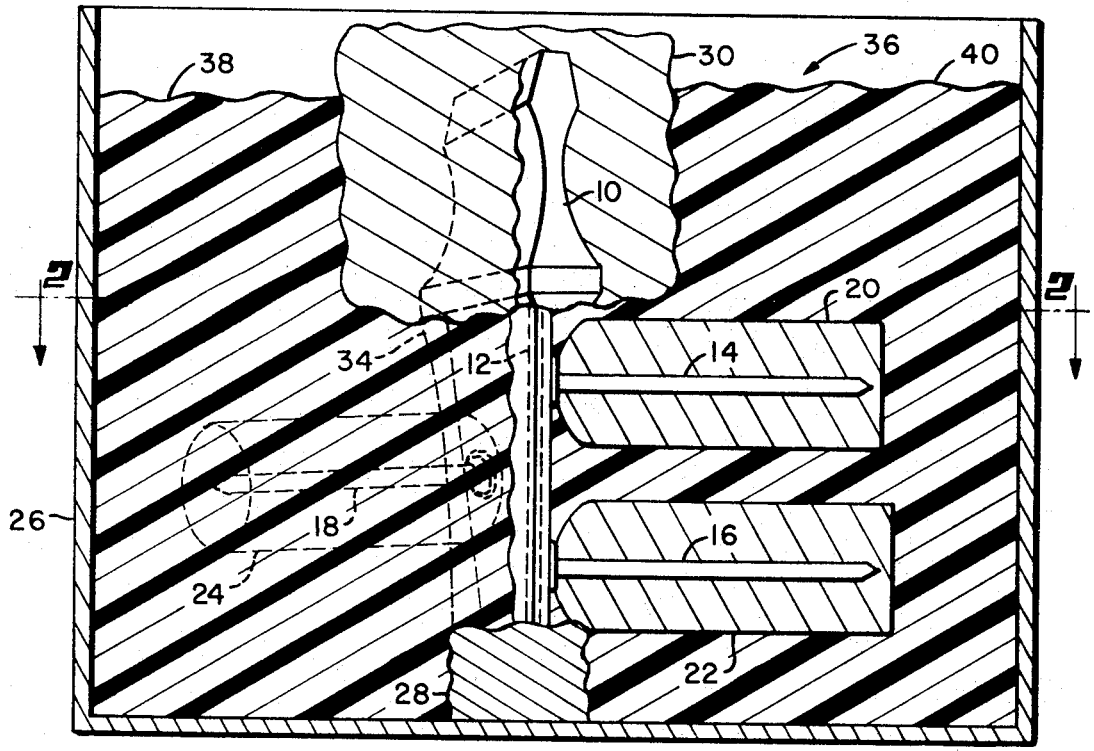
FIG. 1 is a view of a turbomachine blade showing an intermediate step in the formation of an ultrasonic test fixture embodying the present invention.

Referring to FIG. 1, there is shown a turbomachine blade having a root portion 10 and integral airfoil portion 12, as is the usual practice in turbomachine blades. The airfoil portion has a series of internal longitudinal passages 13, 15 for cooling air. It is an object of the present invention to provide an ultrasonic test fixture that permits accurate and rapid determination of these thicknesses.

Figure 2:
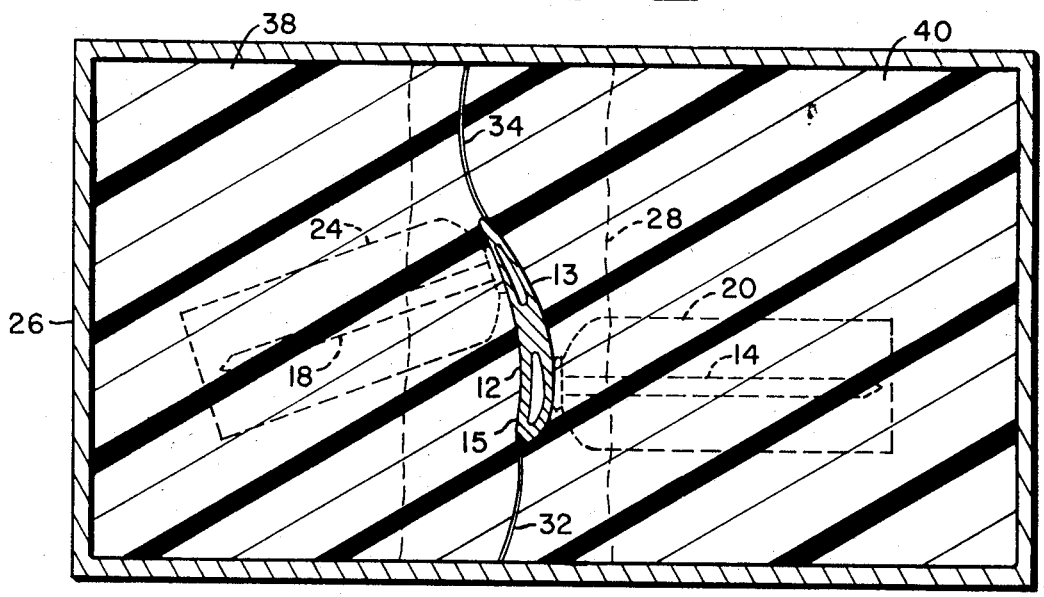
FIG. 2 is a sectional view taken on line 2—2 of FIG. 1.

The test fixture is formed in the manner discussed below. A series of pilot shafts 14, 16 and 18 are attached to the surface of the airfoil portion 12 by a suitable adhesive, such as Eastman 910, available from Eastman Chemical, Rochester, New York. As seen in FIG. 2, the pilot shafts are positioned to be in line with and extend at right angles to the cooling passages 13 and 15 in the blade. As herein illustrated, the pilot shafts are box nails with their heads attached to the blade and their shanks extending generally at right angles from the surface of the blades. However, it should be apparent that any suitable shaft with an appropriate attaching flange may be utilized for this purpose.

Generally cylindrical cores 20, 22 and 24 are telescoped over the shafts 14, 16 and 18, respectively. The cylindrical cores may be pre-machined from aluminum or other material or, as herein illustrated, formed from a low temperature melting point alloy, such as Ceri-low (Woods metal) cast around the pilot shafts.

The blade with the cylindrical cores in position is supported in a mold box 26 by mold wax 28 at the tip of the blade to stand off the blade from the bottom of the mold box. Mold wax 30 is placed around the root of the blade also. Sheets of aluminum foil 32, 34 are attached to the leading and trailing edges of the blade, respectively, and extend to the side walls of the mold box 26. The sheets of aluminum foil also extend from the mold wax 30 to mold wax 28 so that the mold box 26 is divided into two compartments on either side of the airfoil portion 12 of the blade.

When this is done a suitable room-temperature curing resin material, such as a clear cast resin, available from L & S Plastic, Inc., Pontiac, Michigan, is poured into the two compartments of the mold box 26. This material is allowed to cure to a hardened state forming a two-part base, generally indicated by reference character 36. During the curing process of the above material its temperature may reach a level exceeding the melting point of the Woods metal which is used to form the cylindrical cores. For this reason the cylindrical cores are completely encapsulated so that the Woods metal cannot melt and run out of the form during the curing process. If the cylindrical cores are made out of other material, such as aluminum, this would not be necessary and the cores would not have to be completely encapsulated.

Figure 3:
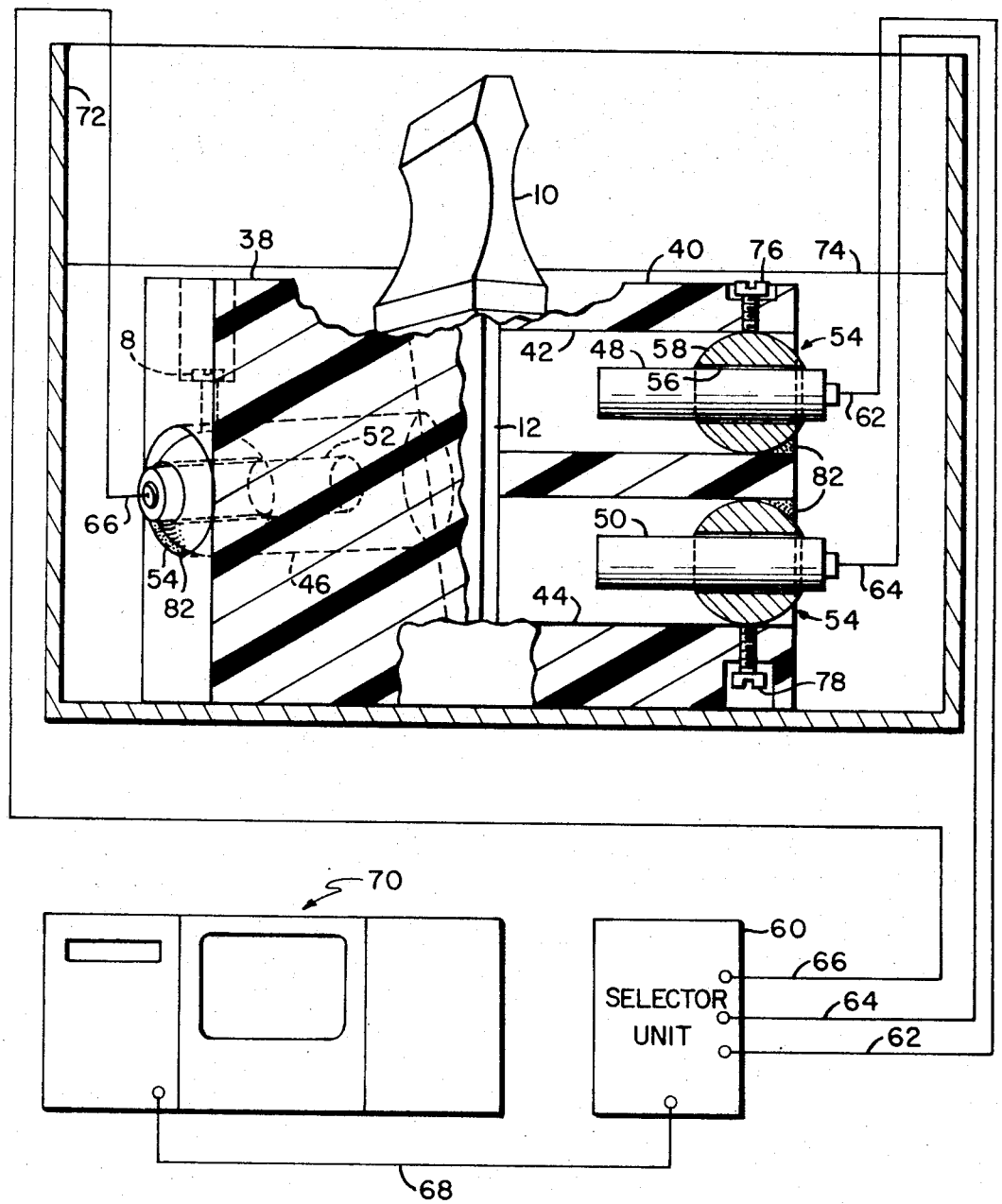
FIG. 3 is a view of a completed ultrasonic test fixture embodying the present invention with a turbomachine blade in place to be tested.

When the base material is hardened the base 36, along with the blade and cores, is removed from the mold box 26. The base material is then ground down to a decreased outer periphery to expose the ends of the cylindrical cores 20, 22 and 24. The base 36 is then immersed in boiling water which melts the Woods metal and allows it to run out of the base material to form a cylindrical passage. The base 36 is then split at the foil sheets 32 and 34 to separate it into two halves 38 and 40. The blade is removed and the nails are removed from the blade along with the mold wax 30 and 28. It is pointed out that suitable parting agents may be employed to aid in the removal of the various components when the mold has been cured. After the above step has been completed the spaces formed by the cylindrical cores 20, 22 and 24 are drilled to remove excess material and produce cylindrical passages 42, 44 and 46 extending generally at right angles from the surface of the blade to the exterior of the base 36, as shown particularly in FIG. 3.

When this is done the halves 38 and 40 are placed together to sandwich the airfoil portion 12 of the turbomachine blade. Ultrasonic transducers 48, 50 and 52 are supported, respectively, in passages 42, 44 and 46 by generally sleevelike elements 54 that are telescoped over the transducers. Elements 54 have an inner bore 56 conforming to the outer surface of the transducers and a generally spherical outer periphery 58 which abuts the walls of the cylindrical passageways. The sleevelike elements 54 are conveniently formed out of spherical nylon balls that have been drilled to form a passage generally similar to the outer peripheral diameter of the ultrasonic transducers.

The ultrasonic transducers may be one of a number of types of transducers suitable for this purpose. It has been found that immersion liquid-focused transducers of 5.0 MH$_z$ output, available from Aerotec Division of Branson Instruments, Inc., Stamford, Connecticut, are particularly useful for this purpose. The transducers 48, 50 and 52 are connected to a selector unit 60 by cables 62, 64 and 66, respectively. The selector unit 60 connects one of the transducers through a cable 68 to an ultrasonic indicating instrument, generally referred to by reference character 70. While many types may be used, it has been found that an instrument incorporating a digital caliper unit and a video display unit, both available from Branson Instruments, Stamford, Connecticut, may be used with particular success. Briefly, this instrument supplies electrical energy to the transducers to produce ultrasonic mechanical vibrations and then through internal circuitry detects the resultant mechanical ultrasonic vibrations from the airfoil portion 12 of the blade. The transducers are of the liquid focused immersion type so that the base 36 is immersed in a tank 72 containing water or another suitable couplant liquid to a level 74.

For ultrasonic testing of this type it is essential that the blades be precisely positioned to produce an optimum signal. In the present case where three different transducers are to be used with a single instrument, it is particularly important that they all be uniformly positioned to give uniform readings. To achieve this end each of the transducers is energized and then displaced and pivoted to a predetermined orientation and position relative to the surface of the blade to produce an optimum signal. Set screws 76, 78 and 80 are tightened when this position has been achieved to hold the transducers in place. When this is done a small amount of adhesive 82, such as the type used to cement the nails to the blade, is applied to an arcuate portion of the outer periphery of the sleevelike elements 54. The transducers are now permanently secured in the optimum position for the particular blade shown. Testing of similar blades is accomplished simply by sandwiching the airfoil portion of the blade between the halves 38, 40 and then sequentially connecting the transducers 48, 50 and 52 to the instrument 70 by means of the selector unit 60 to obtain the thickness measurements at different points in the blade.

The uniformity with which the transducers are positioned enables this sequential measurement. However, the transducers are positioned by the simplified fixture which can be formed for a small fraction of the cost of complex machine fixtures commonly used for this purpose. The pivoting that the sleevelike elements 54 permits enables the passage to be formed only generally at right angles to the surface of the blade, thus eliminating the need for the complex positioning of the cores that form the blade. This in turn permits the use of relatively inexpensive components, such as box nails to form the pilot for the cores. It is apparent that the above fixture has a great deal of flexibility and may be used to economically and rapidly produce fixtures for many types of blades.

While the preferred embodiment of the present invention has been described, it should be apparent to those skilled in the art that it may be practiced in other fashions without departing from the spirit and scope thereof.

Having thus described the invention, what is claimed as novel and desired to be secured by Letters Patent of the United States is:

1. A method of making an ultrasonic test fixture comprising the steps of:
    attaching at least one pilot shaft generally at a right angle to a point on the surface of an irregularly contoured test specimen;
    telescoping over said pilot shaft a generally cylindrical core having an outer diameter sufficiently great to accommodate an ultrasonic transducer;
    forming a base around said test specimen, said pilot shaft and said core;
    removing said core and said pilot shaft and forming a passage extending at generally a right angle from said test specimen;
    supporting an ultrasonic transducer in said passage by a sleevelike element having a generally spherical outer surface abutting the walls of said passage;
    pivoting and displacing said transducer to a predetermined position and orientation relative to said test specimen to produce an optimum signal; and
    securing said sleevelike element in place in said passage.

2. A method as in claim 1 wherein said sleevelike element is resilient and said method comprises the further steps of deforming said sleevelike element to hold said transducer in place after the transducer is in said predetermined position and orientation.

3. A method as in claim 1 wherein said pilot shaft is a box nail wherein its head is secured to said surface and its shank extends from the surface.

4. A method as in claim 1 wherein said cylindrical core is formed from a low temperature melting point material, and said core is removed by elevating its temperature to its melting point after said base has cured.

5. A method as in claim 1 wherein said test fixture is for a turbomachine blade having complex contour and wherein said base is formed in two halves parting at said blade to facilitate its removal and installation.

6. A method as in claim 5 wherein a plurality of passages are formed extending from said blade, each passage having a transducer and a sleevelike element positioned therein.

7. A method as in claim 6 wherein said sleevelike element is secured in place by an adhesive over a portion of the periphery of said sleeve, whereby the remaining portion may be deformed relative to said passage to hold said transducer in place.

8. An ultrasonic test fixture for an irregularly contoured object, said fixture comprising:
    a base having a recess therein conforming to the shape of said irregularly shaped object, said base additionally having at least one generally cylindrical passage extending generally at a right angle from a point on the surface of said irregularly shaped object to the exterior of said base;

an ultrasonic transducer positioned in said passage;

a sleevelike element having an interior surface conforming to and telescoped over the said transducer and having a generally spherical outer periphery abutting the walls of said passage so that said transducer may be oriented relative to said object to produce an optimum signal; and means for securing said spherical sleeve in said cylindrical passage to form a guide for said transducer.

9. An ultrasonic test fixture as in claim 8 wherein said sleeve securing means comprises:

an adhesive securing a portion of the periphery of said element; and a set screw threaded through the wall of said passage in line with the opposite portion of said sleeve to hold said transducer in place in said sleeve.

10. An ultrasonic test fixture as in claim 8 having a plurality of passages extending at right angles from predetermined points from the surface of said object and ultrasonic transducers and sleevelike elements positioned in each one of said passages.

11. An ultrasonic test fixture as in claim 8 wherein said irregularly contoured object is a turbomachine blade and said base is formed in two halves joining along a parting line extending from the upstream and downstream edges of said blade to facilitate removal thereof.

* * * * *